United States Patent [19]

Kohn

[11] 3,852,490

[45] Dec. 3, 1974

[54] ORGANIC PESTICIDE RESIDUE REMOVAL FROM AQUEOUS SOLUTIONS

[75] Inventor: Gustave K. Kohn, Berkeley, Calif.

[73] Assignee: Chevron Research Company, San Francisco, Calif.

[22] Filed: Mar. 6, 1973

[21] Appl. No.: 338,792

[52] U.S. Cl. ............... 426/271, 426/490, 426/491, 426/495, 210/24
[51] Int. Cl. ............................................. A23i 1/02
[58] Field of Search ............ 99/105, 48; 210/24, 54; 260/29.6 PM, 29.6 MA, 29.6 MP, 29.6 MQ, 29.6 MN, 29.6 ME, 87.3; 426/271, 478, 490

[56] References Cited
UNITED STATES PATENTS 3,347,811  10/1967  Bissot ........................ 260/29.6 MQ
3,400,093   9/1968  Feinberg ..................... 260/29.6 MN
3,554,759   1/1971  Beschke ............................ 99/48

Primary Examiner—Wilbur L. Bascomb, Jr.
Assistant Examiner—Hiram H. Bernstein
Attorney, Agent, or Firm—G. F. Magdeburger; John Stoner, Jr.; Raymond Owyang

[57] ABSTRACT

Organic pesticide residues are removed from aqueous solutions by treating the aqueous solution, e.g., wine, with a lower alkene-vinyl lower alkanoate polymer, e.g., ethylenevinyl acetate.

13 Claims, No Drawings

ORGANIC PESTICIDE RESIDUE REMOVAL FROM AQUEOUS SOLUTIONS

DESCRIPTION OF THE PRIOR ART

F. Gnaegi and A. duFour, Revue Suisse de Viticulture, Arboriculture, Horticulture, Vol. 4, No. 3, p. 101 (1972), disclose the removal of pesticide residues from wine with bentonite clay. Although the bentonite clay gave a small percentage removal, the treatment is not effective and spoils the wine.

Chem. Mkt. Rep., Apr. 24, 1972, p. 5, discloses that a polyvinylpyrrolidone polymer is used to prevent white wines from acquiring a brownish hue during aging.

SUMMARY OF THE INVENTION

It has now been found that organic pesticide residues in aqueous solutions can be removed by treating the aqueous solution with a lower alkene-vinyl lower alkanoate polymer, e.g., an ethylene-vinyl acetate polymer.

The process of the invention is particularly useful for the removal of organic pesticides from aqueous solutions such as fermented and other liquid extracts, because the removal is effected without destroying the bouquet and flavor of the extracts.

DESCRIPTION OF THE INVENTION

The process of the invention is generally applicable for the purification of any aqueous solution which contains detectable minor amounts of an organic pesticide, e.g., from about 0.01 ppm to 1000 ppm of pesticide, based on weight solution, preferably from about 0.01 ppm to 50 ppm of pesticide. Examples of aqueous solutions containing minor amounts of organic pesticides include waste water, liquid foods — e.g., milk — and fermented and nonfermented juice extracts — e.g., wine, beer, fruit juices, etc. The process is particularly useful with alcoholic beverages, especially wine, and fruit juices.

Although many aqueous extracts, particularly wine, contain organic components such as ethers, esters and essential oils which give them bouquet and flavor, it has been found that treatment with the alkene-vinyl alkanoate polymer has no adverse effect on the taste of the extracts.

The process of the invention is generally suitable for removing any organic pesticide residue dissolved in detectable quantities in an aqueous solution. However, the process is particularly useful for organic pesticide residues which persist for finite times in the environment (particularly in aqueous environments) before they disintegrate, i.e., persistent organic pesticides. It is appreciated, of course, that organic pesticides which persist in the environment are those most likely to be found in detectable quantities in aqueous solutions.

Examples of persistent organic pesticides include chlorinated hydrocarbons such as octachloro-4,7-methanotetrahydroindane (chlordane) and 1,1,1-trichloro-2,2-bis-(p-chlorophenyl)ethane (DDT); N-trichloromethylthio or N-tetrachloroethylthio substituted (haloalkyl sulfenylated) carboximides such as cis-N-(trichloromethylthio)-4-cyclohexene-1,2-dicarboximide (captan); N-(1,1,2,2-tetrachloroethylthio)-4-cyclohexene-1,2-dicarboximide (DIFOLATAN Fungicide); N-(trichloromethylthio)phthalimide (PHALTAN Fungicide); benzimidazole carbamates such as methyl-1-(butylcarbamoyl)-2-benzimidazole carbamate and methyl-2-benzimidazole carbamate; thioureidobenzenes such as 1,2-bis-(3-ethoxycarbonyl-2-thioureido)-benzene and 1,2-bis-(3-methoxycarbonyl-2-thioureido)-benzene; oxazolidinediones such as 3-(3,5-dichlorophenyl)-5,5-dimethyloxazolidinedione-2,4 (SCLEX); hydrocarbyl aryl methylcarbamates such as 1-naphthyl methylcarbamate, m-(1-methylbutylphenyl methylcarbamate, m-(1-ethylpropyl)phenyl methyl carbamate; and phosphate esters (phosphorothioates and phosphorodithioates) such as 0,0-dimethyl phosphorodithioate of diethyl mercaptosuccinate and 0,0-dimethyl 0-p-nitrophenyl phosphorothioate. Certain metabolites of the above organic pesticides are also removed from aqueous solutions by the process of the invention.

Other pesticides which are suitably removed by the process of the invention from aqueous solutions are tabulated in Chemical Week, June 21, 1972, pp. 33–64, and July 26, 1972, pp. 17–46, the disclosure of which is hereby incorporated by reference.

The polymers employed in the process of the invention are characterized by a non-polar monomer, i.e., the lower alkene, and a polar comonomer, i.e., the vinyl lower alkanoate. Suitable lower ($C_2$–$C_4$) alkene monomers are ethylene, propylene or butylene, and suitable vinyl lower ($C_2$–$C_4$) alkanoate comonomers are vinyl acetate, vinyl propionate, or vinyl butyrate. Suitable lower alkene-vinyl lower alkanoate polymers include propylene-vinyl acetate, propylene-vinyl propionate, butylene-vinyl acetate, butylene-vinyl butyrate, etc.

Alkene-vinyl alkanoate polymers employed in the process of the invention have from about 15 to 45 percent by weight, preferably about 20 to 40 percent by weight, based on total weight polymer, of vinyl alkanoate; a melt index (g/10 min.) of about 2 to 500, inherent viscosity of about 0.5 to 1.1 (0.25 g/100 ml toluene, 30°C.); and density of about 0.93 to 0.96 g/cc. Suitable alkene-vinyl alkanoate polymers include those having a small portion of the vinyl alkanoate in the form of vinyl alkanoic acid. Such alkene-vinyl alkanoate-vinyl alkanoic acid terpolymers, e.g., ethylene-vinyl acetate-vinyl acetic acid terpolymer, generally have an acid number in the range of 4 to 8. The alkene-vinyl alkanoate polymer may also include minor amounts, e.g., 10–30 percent by weight, based on total weight of polymer, of an additional polymer such as polystyrene, polyvinylpyrrolidine, polyvinyl chloride, etc. However, the polymers preferred for use in the process of the invention are those consisting essentially of an alkene and a vinyl alkanoate, especially ethylene and vinyl acetate.

The alkene-vinyl alkanoate polymers are known materials. For example, the ethylene-vinyl acetate copolymers are commercially available and have been approved by governmental agencies for use requiring contact with foodstuffs. See, for example, F.D.A. regulation 121.2570, "Ethylene-Vinyl Acetate Copolymers."

The method of contacting the alkene-vinyl alkanoate polymers with the aqueous solution is not critical. However, in order to achieve maximum contact between the polymer and the aqueous solution, it is generally advantageous to use a foamed polymer or small polymer particles or granules having large surface area, e.g., polymer particles having particle size of about 1 mm to 100 mm, preferably about 10 mm to 50 mm.

In one modification, the polymer and aqueous solution are contacted by simply placing the polymer in the aqueous solution and allowing the polymer to float on top of the solution, and removing the polymer by filtration or decantation after treatment. This method is particularly useful when it is necessary to store the aqueous solution for a long period of time, e.g., as during the fermentation of fruit juices. In another modification, the aqueous solution is stored in a container with stoppers made of the polymer or a container coated with a thin layer of the polymer. However, in order to achieve pesticide removal in a short period of time, it is necessary to use agitation or mixing. For example, the polymer can be packed in a fixed column, or coated on a grid or the inside of a tube, and the aqueous solution allowed to flow or filter through.

The treatment of the polymer and aqueous solution can be carried out at any convenient temperature, e.g., 0° to 100°C., or pressure, e.g., superatmospheric, subatmospheric or atmospheric. The most convenient temperature is generally ambient temperature and the most convenient pressure is generally atmospheric.

The amount of polymer employed to treat the aqueous solution is dependent in part on the method of contact and the amount of organic pesticide residue in the solution. Generally, amounts from 1 to 200 percent by polymer based on weight of aqueous solution, are satisfactory, although amounts from 5 to 25 percent by weight of polymer are preferred.

The process of the invention is illustrated by the following examples.

EXAMPLES

Example 1

Approximately 2 ppm of cis-N-(trichloromethylthio)-4-cyclohexene-1,2-dicarboximide (captan), 2 ppm of 1,1,1-trichloro-2,2-bis-(p-chlorophenyl)ethane (DDT) and 2 ppm 3-(3,5-dichlorophenyl-5,5-dimethyloxazolidinedione-2,4 (SCLEX) were placed in separate beakers containing 1000 ml of 10 percent by volume ethanol in distilled water. 15 g of an ethylene-vinyl acetate copolymer having 32–34 percent by weight vinyl acetate (du Pont ELVAX 150 Copolymer) was added to each beaker and the resulting mixture stirred at 25°C. The copolymer was removed after 4 hours and replaced with a fresh 15-g sample. The amount of pesticide in the aqueous alcohol solution after various time intervals is tabulated in Table I.

TABLE I

Pesticide Removal From Aqueous Alcohol Solution

| Time hrs. | Captan, ppm | DDT, ppm | SCLEX, ppm |
|---|---|---|---|
| 0 | 1.95 | 1.6 | 1.86 |
| 1 | 1.65 | 0.75 | 1.11 |
| 2 | 1.2 | 0.60 | 0.82 |
| 4 | 1.2 | 0.45 | 0.34 |
| 24 | 0.3 | 0.15 | 0.04 |

Example 2

A California white wine was adulterated with approximately 0.1 µ/ml of 3-(3,5-dichlorophenyl)-5,5-dimethyloxazolidinedione-2,4 (SCLEX). Samples of the wine were then agitated with ethylene-vinyl acetate copolymers having various amounts of vinyl acetate. 15 g of copolymer were employed with each 1,000-ml sample of wine. The amount of pesticide in the wine samples after various periods of agitation is tabulated in Table II

TABLE II

Removal of SCLEX Residue from Wine

| Polymer, % Vinyl Acetate | | SCLEX, ppm | | |
|---|---|---|---|---|
| | | 0 hour | 4 hours | 24 hours |
| 32–34% | (ELVAX 150) | 0.093 | 0.014 | 0.007 |
| 17.5–18.5% | (ELVAX 420) | 0.1 | 0.04 | 0.02 |
| 27–29%* | (ELVAX 4260) | 0.1 | 0.04 | 0.02 |

*contains a small amount of vinyl acetic acid (acid number 4–8)

Example 3

A 1,000-g sample of white wine (California sauterne) was adulterated with about 1.5 to 1.65 ppm of 3-(3,5-dichlorophenyl)-5,5-dimethyloxazolidinedione-2,4 (SCLEX). The wine was then mixed with 5 g of ethylene-vinyl acetate copolymer particles (du Pont ELVAX 150) having 32–34 percent by weight vinyl acetate and a melt index of 38–48, and agitated at 25°C. For comparison, the experiment was repeated with polypropylene and nylon granules. The amount of SCLEX remaining in the wine after various time intervals is tabulated in Table III.

TABLE III

Removal of SCLEX Residue from Wine

| Polymer | Time (Hours) | Residue, ppm |
|---|---|---|
| Ethylene-vinyl acetate | 0 | 1.65 |
| | 4 | 0.30 |
| | 24 | 0.10 |
| | 48 | 0.03 |
| Nylon | 0 | 1.50 |
| | 4 | 1.50 |
| | 24 | 1.42 |
| | 48 | 1.35 |
| Polypropylene | 0 | 1.65 |
| | 4 | 1.20 |
| | 24 | 1.35 |
| | 48 | 1.35 |

Example 4

A 1,000-g sample of white wine (California sauterne) was adulterated with about 0.80 to 0.85 ppm of N-(1,1,2,2-tetrachloroethylthio)-4-cyclohexene-1,2-dicarboximide (DIFOLATAN Fungicide). The wine was then agitated at 25°C. with 15 g of an ethylene-vinyl acetate copolymer having 32–34 percent by weight of vinyl acetate and a melt index of 38–48. For comparison, the experiment was repeated with polypropylene and nylon granules. The amount of DIFOLATAN remaining in the wine after various time intervals is tabulated in Table IV.

TABLE IV

Removal of DIFOLATAN from Wine

| Polymer | Time (Hours) | Residue, ppm |
|---|---|---|
| Ethylene-vinyl acetate | 0 | 0.80 |
| | 4 | 0.30 |

TABLE IV-Continued

Removal of DIFOLATAN from Wine

| Polymer | Time (Hours) | Residue, ppm |
| --- | --- | --- |
| | 24 | 0.16 |
| | 48 | 0.04 |
| Polypropylene | 0 | 0.85 |
| | 4 | 0.93 |
| | 24 | 1.11 |
| | 48 | 0.91 |
| Nylon | 0 | 0.81 |
| | 4 | 0.90 |
| | 24 | 0.81 |
| | 48 | 0.43 |

Example 5

Six 1-liter bottles of a French V.D.Q.S. (Vin Delimite de Qualite Superieure) red wine from the same batch were tested to evaluate wine properties after addition of ethylene-vinyl acetate copolymer. An ethylene-vinyl acetate copolymer (EVA) having 32–34 percent by weight of vinyl acetate (ELVAX 150) was added to each bottle in amounts of 0, 1, 2, 4, 8 and 16 grams. After flushing the bottles with nitrogen, the bottles were sealed. After 33 days of storage without stirring, the wine was tested by 3 operators. No difference in color, taste or flavor in the six bottles of wine could be detected by the operators. The bottles which contained 0, 2, 8 and 16 grams of copolymer were analyzed for typical wine properties. The results are tabulated in Table V.

TABLE V

Wine Properties after Addition of EVA

| | Wine (Grams Copolymer) | | | |
| --- | --- | --- | --- | --- |
| | 0 | 2 | 8 | 16 |
| Density | 993.0 | 993.3 | 993.5 | 993.5 |
| Alcohol | 11.05 | 11.10 | 11.15 | 11.10 |
| Total acidity | 3.7 | 3.7 | 3.7 | 3.8 |
| Volatile acidity | 0.48 | 0.36 | 0.44 | 0.56 |
| Fixed acidity | 3.0 | 3.1 | 3.1 | 3.1 |
| Free SO$_2$ | 23 | 23 | 20 | 23 |
| Total SO$_2$ | 95 | 90 | 97 | 95 |
| Clearing aspect | good | good | good | good |

Example 6

A French Bordeaux wine (Chateau Lestrille) was adulterated with 2 ppm of 3-(3,5-dichlorophenyl)-5,5-dimethyloxazolidinedione-2,4 (SCLEX). Samples of the wine were then stored at 4–6°C. without agitation after addition of various amounts of an ethylene-vinyl acetate copolymer having 32–34 percent by weight of vinyl acetate. The amount of copolymer employed and the amount of SCLEX in the wine at various time intervals after treatment is tabulated in Table VI.

TABLE VI

Removal of SCLEX from Wine

| EVA Copolymer, g/l | SCLEX, ppm | | | |
| --- | --- | --- | --- | --- |
| | 0 day | 10 days | 20 days | 30 days |
| 1 | 2 | 1.43 | 1.38 | 1.20 |
| 2 | 2 | 1.24 | 1.12 | 0.88 |
| 4 | 2 | 1.0 | 0.75 | 0.49 |
| 8 | 2 | 0.65 | 0.36 | 0.19 |

Example 7

Two samples of unfermented grape juice were adulterated with approximately 4 ppm of 3-(3,5-dichlorophenyl)-5,5-dimethyloxazolidinedione (SCLEX) and two samples were left unadulterated. One of the adulterated and one of the unadulterated samples were then treated with an ethylene-vinyl acetate copolymer having 32–34 percent by weight of vinyl acetate (ELVAX 150) at a concentration of 5 grams per liter. Fermentation according to an accepted procedure utilized in France proceeded without problems in all of the four grape juice samples. There was no external agitation during fermentation. After 16 days of treatment with the ethylene-vinyl acetate copolymer, there was an approximately 90 percent reduction of the pesticide in the adulterated samples. No taste differences could be detected in the four samples after fermentation.

For comparison, the experiment was repeated with three commercial grades of paraffin waxes. After 16 days of treatment with the paraffin waxes, analysis showed the concentration of SCLEX was 3.87 to 4.06 ppm.

Example 8

Grapes were harvested, crushed, and the resultant clear grape juice was pasteurized. Analysis of the grape juice showed 1.48 ppm of 3-(3,5-dichlorophenyl)-5,5-dimethyloxazolidinedione-2,4 (SCLEX), which was used as a fungicide on the grape plants. The grape juice was treated with 15 g/l of an ethylenevinyl acetate copolymer having 32–34 percent by weight of vinyl acetate (ELVAX 150), with and without agitation. With agitation, the amount of SCLEX in the grape juice after 22 hours was 0.11 ppm. Without agitation, the amount of SCLEX in the grape juice after 3 days was 0.58 ppm, after 6 days 0.25 ppm, and after 10 days 0.08 ppm.

What is claimed is:

1. A process for removing organic pesticides selected from chlorinated hydrocarbons, haloalkyl sulfenylated carboximides, haloalkyl sulfenylated phthalimides, benzimidazole carbamates, thioureidobenzenes, oxazolidinediones, hydrocarbyl aryl methylcarbamates or phosphate esters from aqueous solutions containing about 0.01 ppm to 1,000 ppm of said pesticides which comprises contacting said aqueous solution with from 1 to 200 percent by weight, based on weight of aqueous solution, of a $C_2$–$C_4$ alkene-vinyl $C_2$–$C_4$ alkanoate polymer having a melt index of about 2 to 500 g/10 min., an inherent viscosity of about 0.5 to 1.1, a density of about 0.93 to 0.96 g/cc, and from about 15 to 45 percent by weight based on weight of polymer, of vinyl alkanoate.

2. The process of claim 1 wherein the polymer is ethylene-vinyl acetate.

3. The process of claim 1 wherein organic pesticides are dissolved in the aqueous solution in amounts of about 0.01 ppm to 50 ppm.

4. The process of claim 2 wherein organic pesticides are dissolved in the aqueous solution in amounts of about 0.01 ppm to 50 ppm and are selected from the group consisting of octachloro-4,7-methanotetrahydroindane, 1, 1,1-trichloro-2,2-bis-(p-chlorophenyl)ethane, cis-N-(trichloromethylthio)-4-cyclohexene-1,2-dicarboximide, N-(1,1,2,2-tetrachloroethylthio)-4-cyclohexene-1,2-dicarboximide, N-(trichloromethylthio)phthalimide, methyl-1-(butylcarbamoyl)-2-benzimidazole carbamate, methyl-2-benzimidazole carbamate, 1,2-bis-(3- ethoxycarbonyl-2-thioureido)-benzene, 1,2-bis-(3-methoxycarbonyl-2-thioureido)-benzene, 3-(3,5-dichlorophenyl)-5,5-dimethyloxazolidinedione-2,4, 1-naphthyl methylcarbamate, m-(1-methylbutylphenyl methylcarbamate, m-(1-ethylpropyl)-phenyl methyl carbamate, 0,0-dimethyl phosphorodithioate of diethyl mercaptosuccinate and 0,0-dimethyl 0-p-nitrophenyl phosphorothioate.

5. The process of claim 4 wherein the aqueous alcoholic solution is a fermented fruit juice.

6. The process of claim 4 wherein the aqueous alcoholic solution is wine.

7. The process of claim 1 wherein the aqueous solution is a fruit juice.

8. The process of claim 7 wherein the fruit juice is grape juice.

9. The process of claim 2 wherein the organic pesticide residue is 1,1,1-trichloro-2,2-bis-(p-chlorophenyl)ethane.

10. The process of claim 2 wherein the organic pesticide residue is cis-N-(trichloromethylthio)-4-cyclohexene-1,2-dicarboximide.

11. The process of claim 2 wherein the organic pesticide residue is 3-(3,5-dichlorophenyl)-5,5-dimethyloxazolidinedione-2,4.

12. The process of claim 2 wherein the organic pesticide residue is N-(1,1,2,2-tetrachloroethylthio)-4-cyclohexene-1,2-dicarboximide.

13. The process of claim 2 wherein the polymer contains a minor amount of vinyl acetic and has an acid number in the range of 4 to 8.

* * * * *